May 8, 1923.

B. F. WEBER 1,454,826

METHOD OF AND MEANS FOR MAKING BRICKS

Filed June 17, 1922     12 sheets-sheet 1

May 8, 1923.                              1,454,826
B. F. WEBER
METHOD OF AND MEANS FOR MAKING BRICKS
Filed June 17, 1922         12 sheets-sheet 5

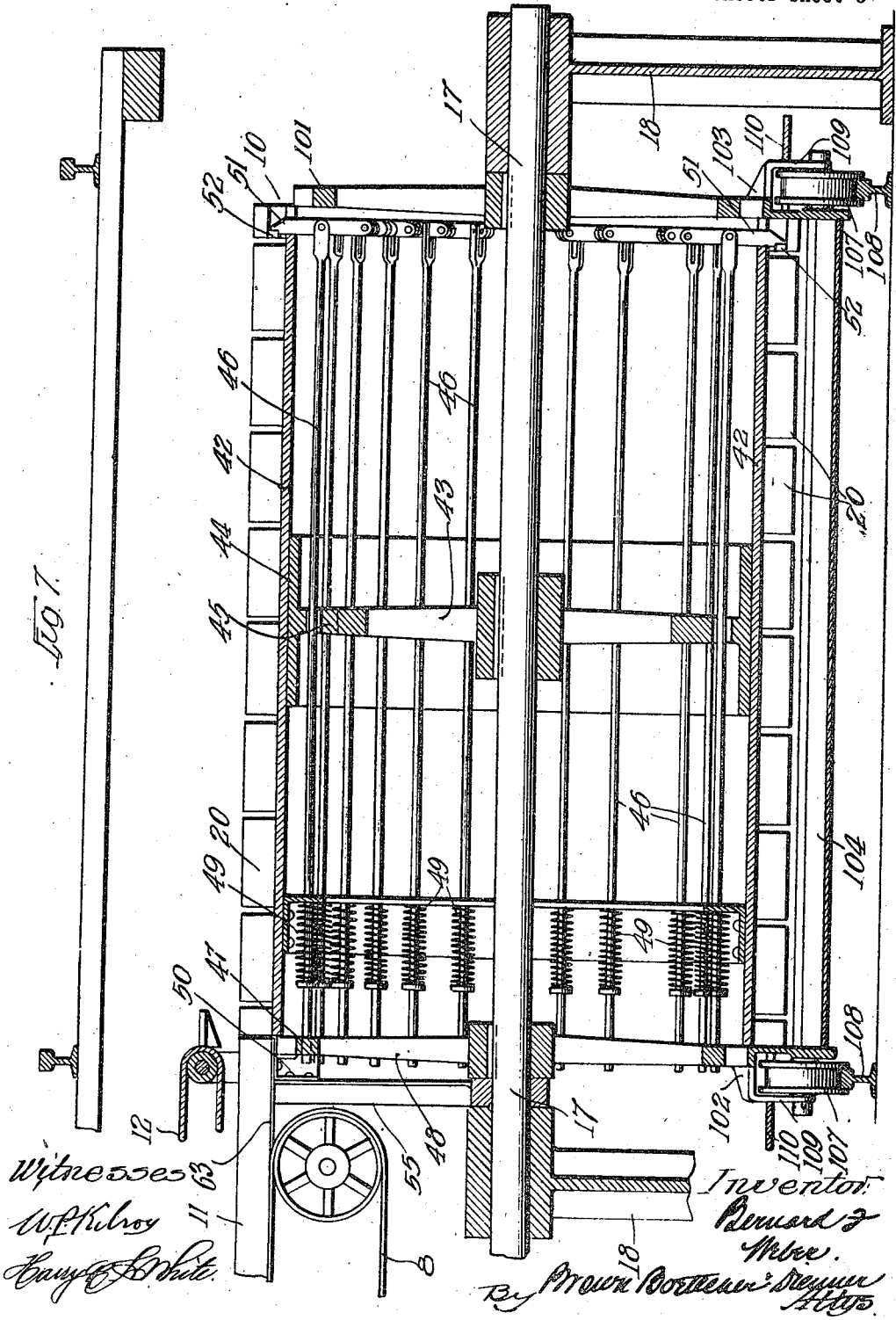

May 8, 1923.
B. F. WEBER
1,454,826
METHOD OF AND MEANS FOR MAKING BRICKS
Filed June 17, 1922  12 sheets-sheet 7
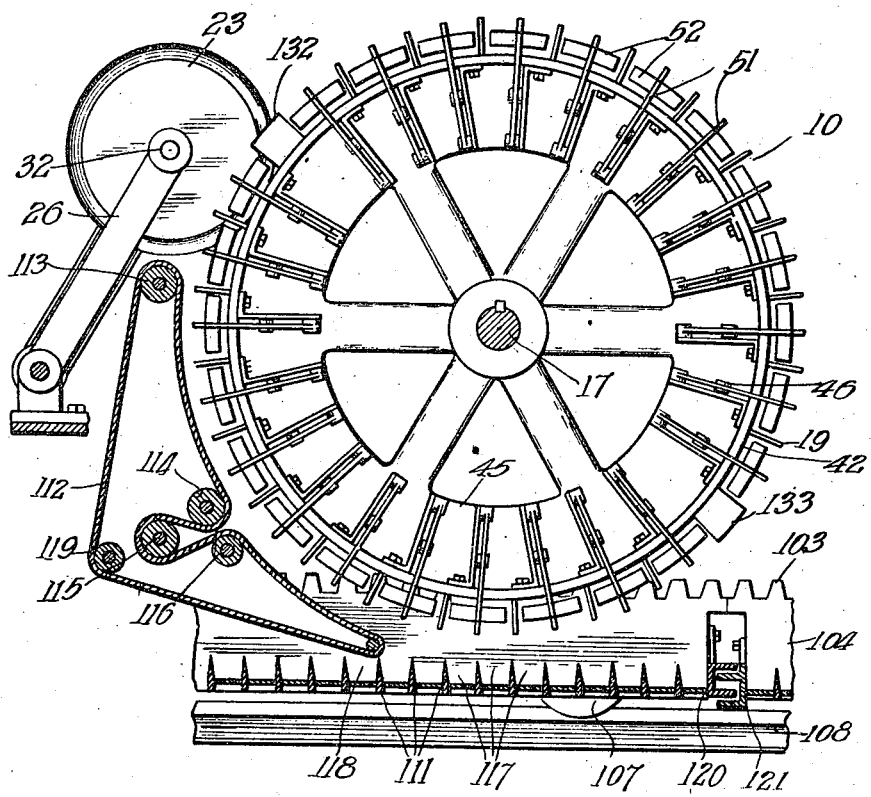

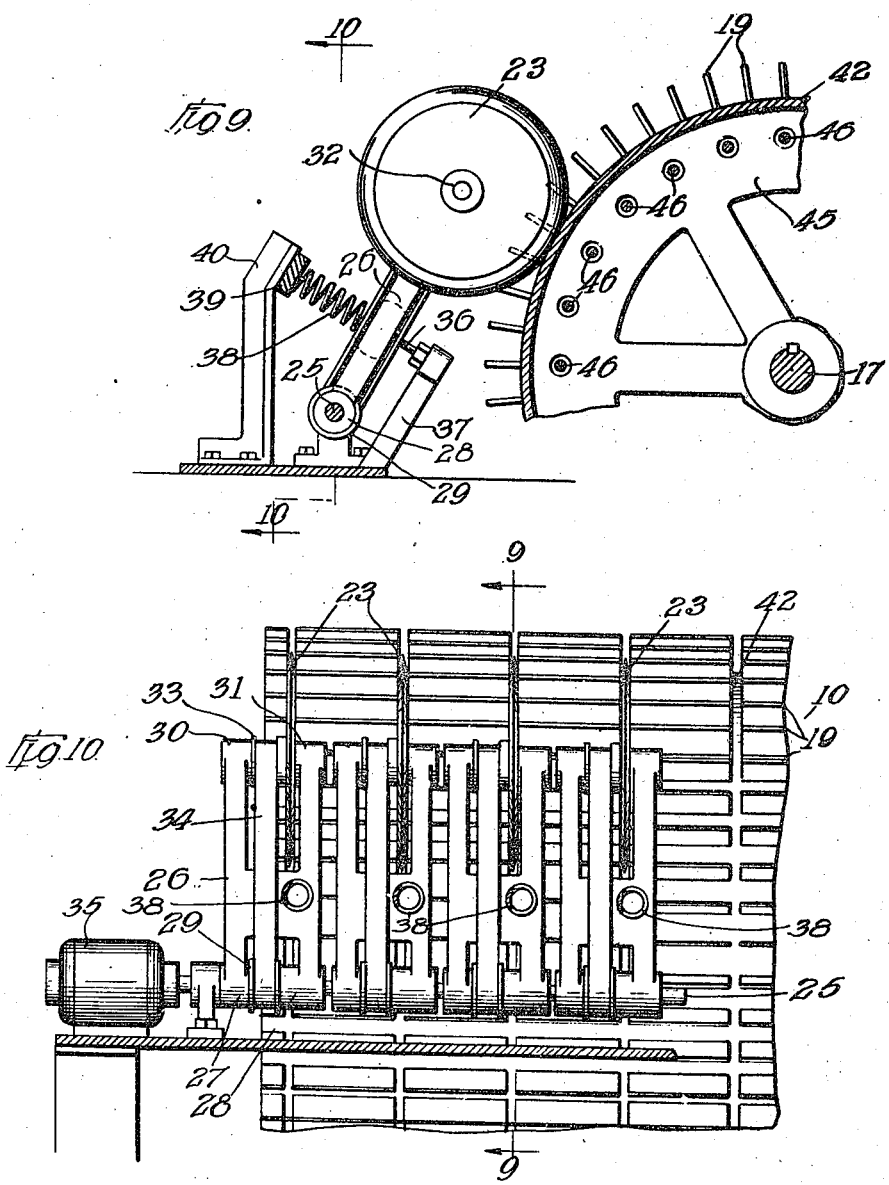

May 8, 1923.

B. F. WEBER 1,454,826

METHOD OF AND MEANS FOR MAKING BRICKS

Filed June 17, 1922  12 sheets-sheet 9

Witnesses:
W. H. Kilroy
Harry R. L. White

Inventor:
Bernard F. Weber
By Brown, Boettcher & Dienner
Attys

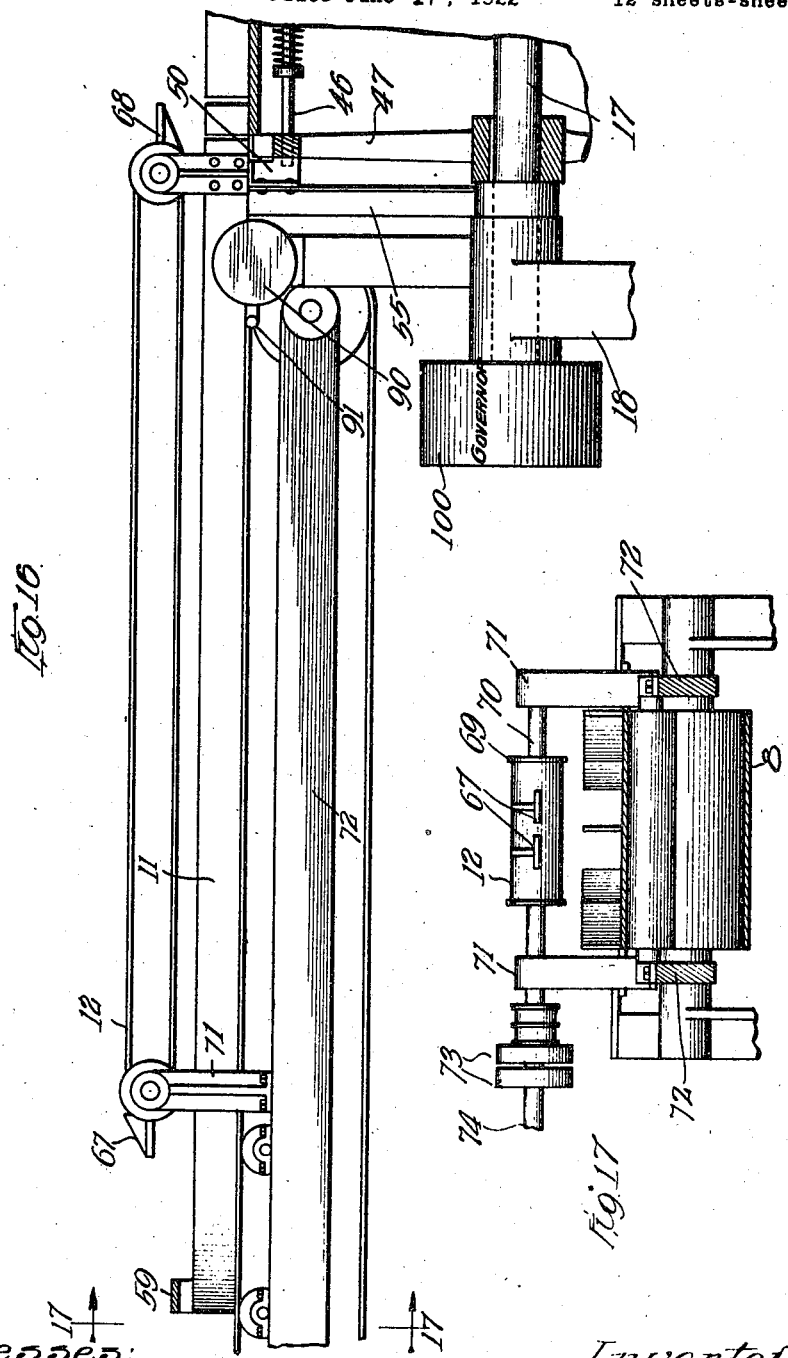

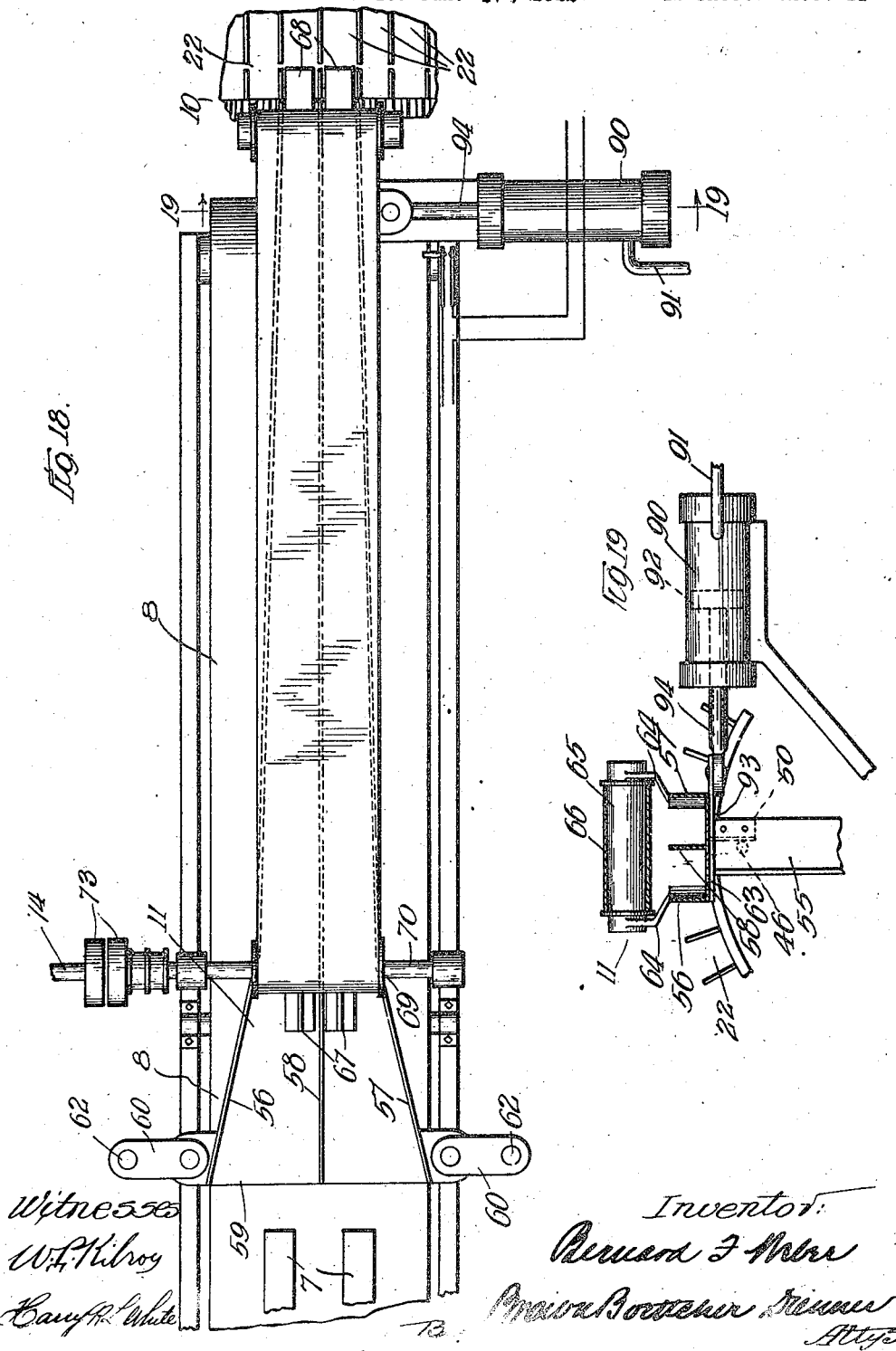

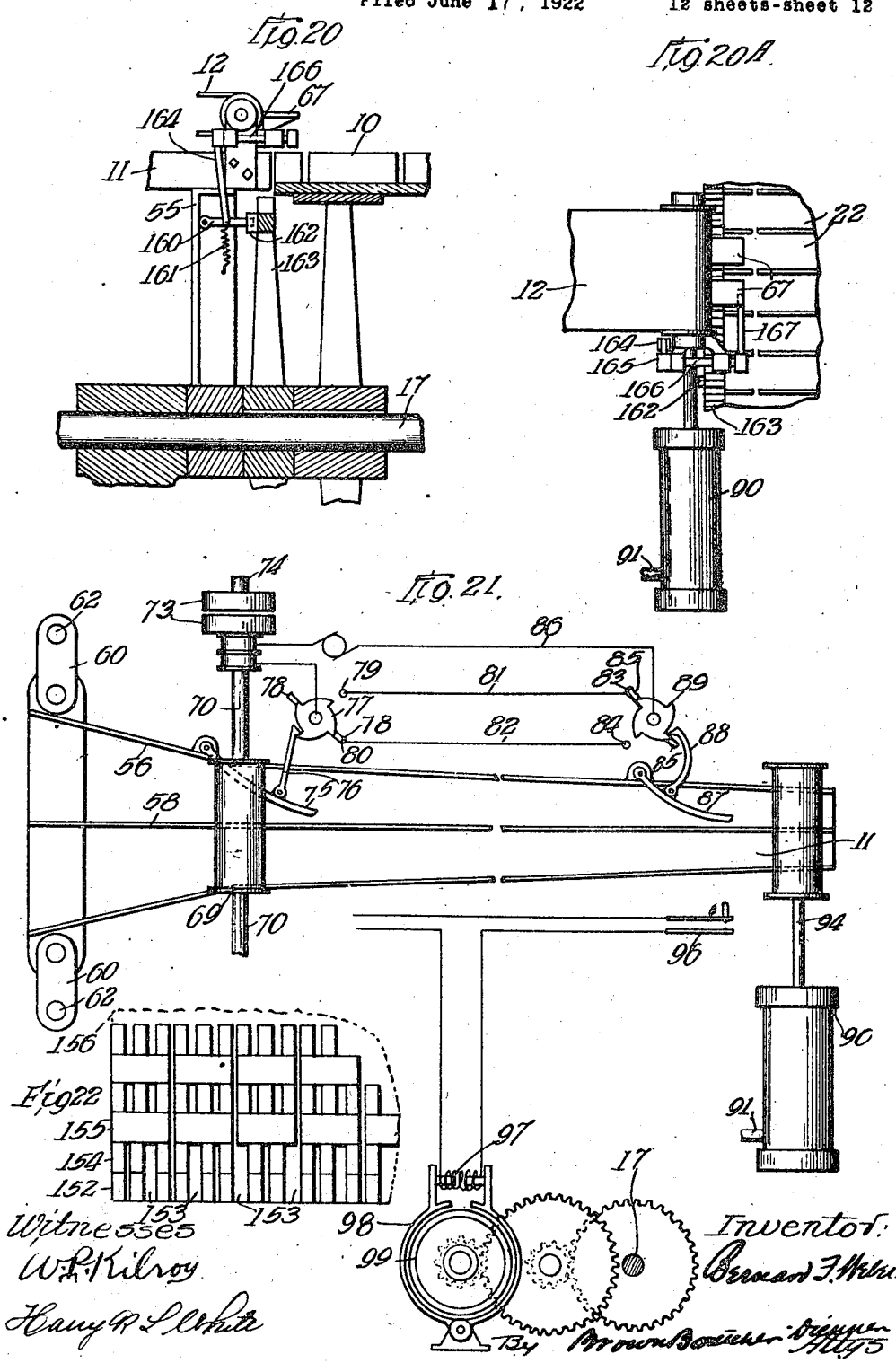

Patented May 8, 1923.

1,454,826

UNITED STATES PATENT OFFICE.

BERNARD F. WEBER, OF CHICAGO, ILLINOIS.

METHOD OF AND MEANS FOR MAKING BRICKS.

Application filed June 17, 1922. Serial No. 568,971.

*To all whom it may concern:*

Be it known that I, BERNARD F. WEBER, a citizen of the United States, residing at Chicago, in the county of Cook and State of Illinois, have invented a certain new and useful Improvement in Methods of and Means for Making Bricks, of which the following is a full, clear, concise, and exact description, reference being had to the accompanying drawings, forming a part of this specification.

My invention relates to the method of and means for making bricks.

In the making of bricks as now generally practiced, the clay is duly prepared and forced thru a die, which emits a continuous stream of clay of a cross-section which is the same as the cross-section of the bricks.

The stream is fed endwise upon a forward traveling surface where the stream of clay is cut into proper brick lengths. The individual bricks are then separated upon a belt which travels faster than the speed of emission clay from the die.

The bricks must be then taken from this belt and collected in a stack. This stack is usually formed on a small dryer car which is then moved thru the dryer. Thereafter, the bricks are set in the kiln.

This operation of removing the bricks from the belt and piling them upon the car in a stack is known as hacking the bricks. Practically all other operations in connection with the handling of the clay and the handling of the bricks, either green or burned, may be performed or materially assisted by power-driven machinery. However, the hacking of the bricks so far is a hand operation. It is the most troublesome operation in the industry. Labor of a more or less expert character is required and the work is hard. There is no let-up since the bricks must all pass thru this operation.

While the matter of hacking the bricks has had the attention of brick manufacturers constantly for a great many years, it has continued to be the "neck of the bottle."

My invention dispenses with the step of hacking, as now practiced. The key to my invention lies in the fact that I do not cut the clay into finished bricks until the clay is in place, such that the resultant bricks are really assembled. That is, instead of cutting the clay bar into bricks and then assembling the finished bricks, I assemble the clay bar and cut the finished bricks in place.

The organization of mechanism to perform this novel operation is itself new, and is explained in detail and claimed hereafter.

In brief outline, I employ the following apparatus and mode of procedure. The clay is emitted from the brick machine in one or more bars, usually two. These bars run on to a measuring table or belt. They are then cut into slugs which are of several brick lengths in length (for example 8 brick lengths).

These slugs are then advanced onto a belt to a wheel which has peripheral pockets of a suitable character to receive the slugs. A kicker shoots the slugs into the pockets of the wheel and the wheel is advanced progressively for registering the next pocket with the next slug or slugs. The slugs are then cut into brick lengths on the wheel. The bricks are discharged by gravity from the wheel to specially constructed cradles which move on wheels running upon tracks.

The cradles are advanced to an elevator for assembling the cradlefuls in a stack. The cradles are substantially square in outline. They move to an elevator which takes them from a given level and moves them down to a point where they may discharge the load of bricks by gravity. I employ two cars for receiving the bricks. The cars have oblong, rectangular platforms. Two cars are run on tracks under the elevator, side by side, to form a substantialy square joint platform.

The cradles deposit their layers of brick, each cradle forming a layer, alternately cross, that is at 90° to each other, except for the first two layers which overlie each other in matched relation, for the employment of the well known setting crane.

This crossing of alternate layers may be secured in different ways, as for instance, by rotating the cars themselves, by bringing in the cradles at right angles to each other on separate tracks upon the elevator, by rotating the cradles upon the elevator, or by any other preferred method of operation.

The two cars which were placed under the elevator are then moved off on laterally divergent tracks to separate the bricks into two separate crane loads, one on each car. From the cars the bricks are taken by the crane, set into a kiln and burned. This latter operation is well known in the art.

In order to acquaint those skilled in the art with the manner of constructing and operating my invention, I shall now describe in connection with the accompanying drawings, a specific embodiment of the same.

In the drawings, Figure 1 is a plan view of a machine embodying my invention with necessary auxiliary apparatus.

Fig. 4A illustrates a modified form of hacking reel.

Fig. 7 is a vertical cross-sectional view of the hacking reel and the cradles underneath the same taken on the line 7—7 of Fig. 1.

Fig. 8 is a cross-sectional view of the bottom of the cradles, taken on the line 8—8 of Fig. 1, showing also a cross-section of the hacking reel and the belt which cooperates therewith.

Fig. 9 is a fragmentary cross-sectional view of the hacking reel, together with the cutting discs for severing the slug into brick lengths.

Fig. 10 is a front elevational view of the device shown in Fig. 9, illustrating the individual cutting discs for each line of severance.

Fig. 16 is a side elevational view of the kicker for taking the slugs of clay from the belt and shooting them into the pockets on the reel.

Fig. 17 is a view taken on the line 17—17 of Fig. 16, showing the manner in which the kicker arms pass thru the guides for moving the slugs of clay into the pockets on the reel.

Fig. 18 is a plan view of the structure shown in Fig. 16, and

Fig. 19 is a section taken on the line 19—19 of Fig. 18, illustrating the pneumatic cylinder for opposing the motion of the reel.

Fig. 20 is a fragmentary sectional view of a modified form of trip for controlling the connection of the reel and the guides and the trip for the same.

Fig. 20A is a fragmentary plan view of the same.

Fig. 21 is a diagram of the control for the kicker, and

Fig. 22 illustrates the manner of stacking the bricks so that they may be raised by a crane.

Figure 1:
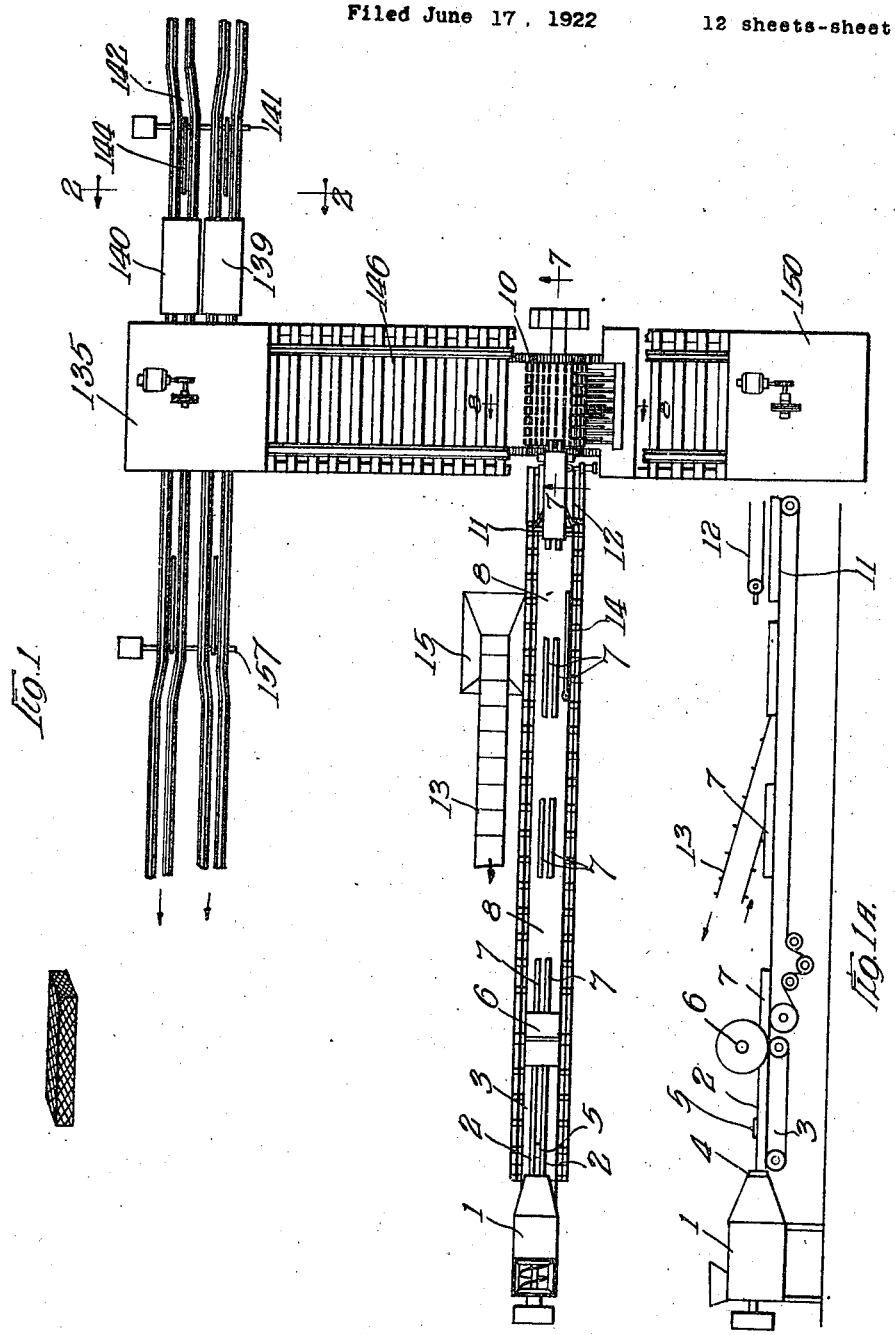

Referring now to Fig. 1, the brick machine 1, which is of any known or suitable construction has a multiple die which discharges two streams of clay 2, upon the traveling belt 3. The traveling belt 3 is known as the measuring belt and it serves the purpose of taking off the clay from the die 4 at the speed at which the clay is emitted. The streams 2—2 are spread apart by means of a spreader 5 so that they may be acted upon more freely and then pass under the cutting reel 6, which serves to cut the bars 2—2 into bars or slugs 7 of a length in this case the length of 8 bricks. After the bar case has been cut into slugs 7, these slugs are taken forward on the off-bearing belt and table 8 which advances the slugs at a more rapid rate towards the hacking reel 10, thru the medium of the guides 11 and the kicker 12.

The off-bearing belt 8 is in the nature of a conveyor employing a web or belt with a supporting table and it is driven at a rate sufficiently rapid that it will separate the slugs 7 from each other, a distance sufficient to permit shifting of the guides 11 from one pocket or set of pockets to another on the reel 10 before another slug arrives in the guide 11.

A traveling conveyor 13 is provided at one side of the off-bearing belt 8 and a sweep 14 is arranged at one side of the off-bearing belt so that in case of spoiled slugs or in case the reel 10 or any of the connected parts are not in position to receive the slugs or bars 7 coming from the mill 1, the sweep 14 may be placed diagonally across the conveyor belt 8 and the slugs will be swept into the hopper 15 and conveyed by the belt 13 back to the pug mill and will be mixed with the incoming clay to be re-worked and passed again thru the brick machine 1.

The guides 11 are arranged to direct the parallel slugs 7 into suitable pockets on the reel 10, and the kicker 12 is a means for projecting the slugs rapidly from the belt or conveyor 8 into said pockets so that the reel 10 may advance to discharge the bricks therefrom and to receive succeeding slugs of clay.

Figure 3:
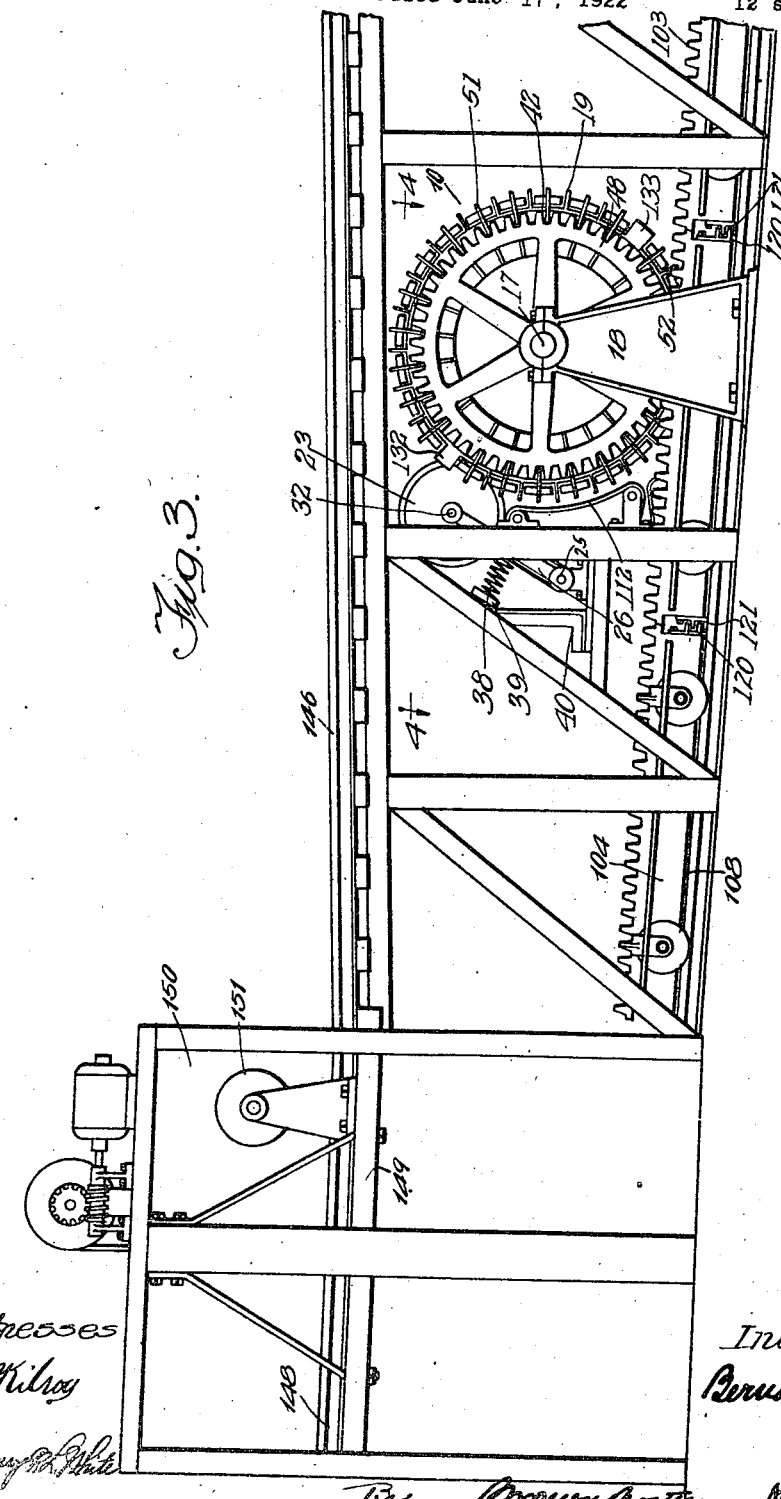
Fig. 3 is a side elevational view taken from the right of Fig. 1, showing the receiving wheel, (which I term the hacking reel), in elevation, together with the tracks for receiving the empty cradles, the elevator for lowering them and the lower track for feeding the cradles forward to the wheel, where they receive the bricks.
Figure 4:
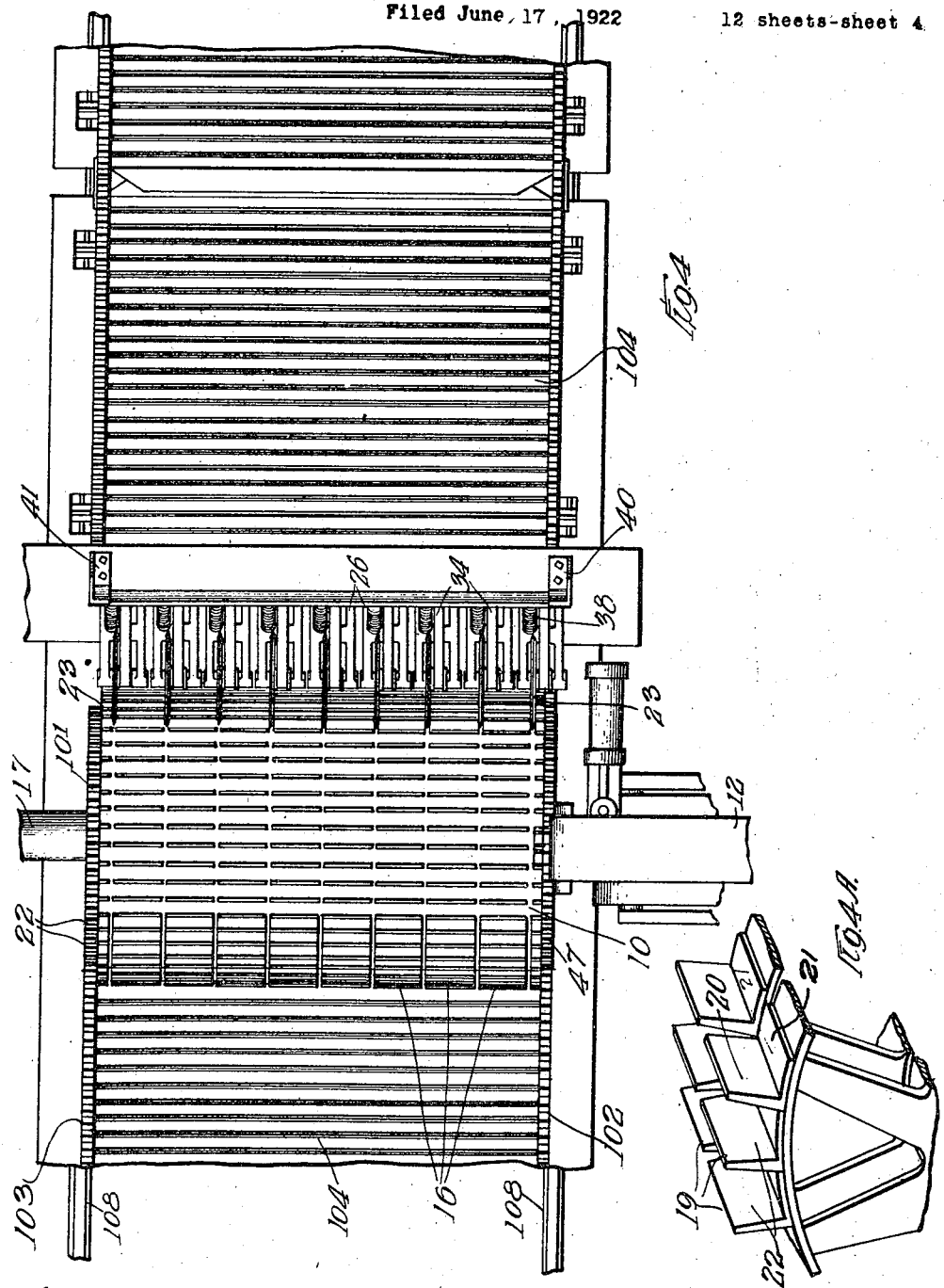
Fig. 4 is a plan view of the wheel and cradles taken on line 4—4 of Fig. 3.
Figure 5:
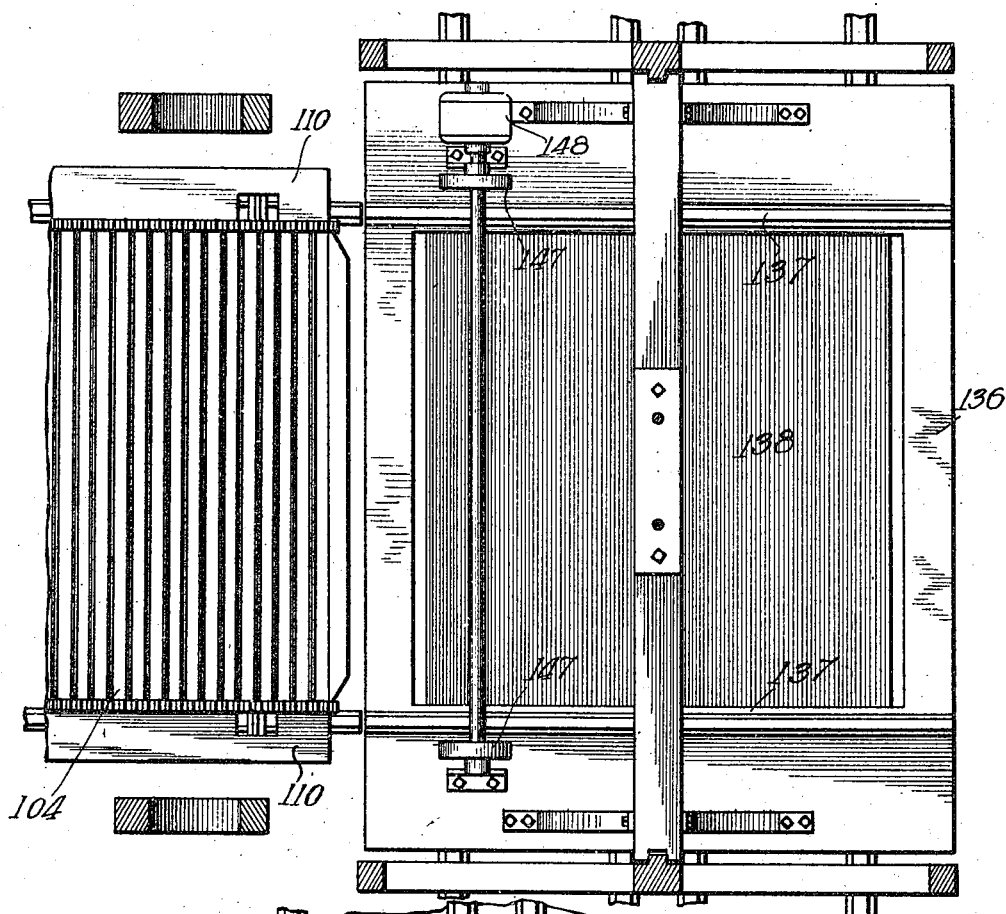
Fig. 5 is a plan view of the elevator taken on the line 5—5 of Fig. 2 showing the cradles as they advance to the elevator and means for moving the cradles off and on to the elevator.
Figure 6:
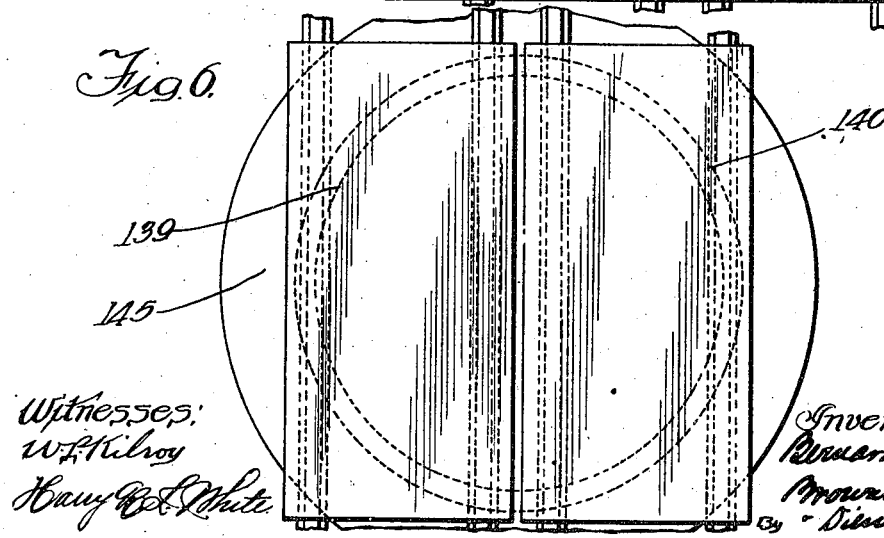
Fig. 6 is a plan view of the two cars in place on the turntable under the elevator.
Figure 11:
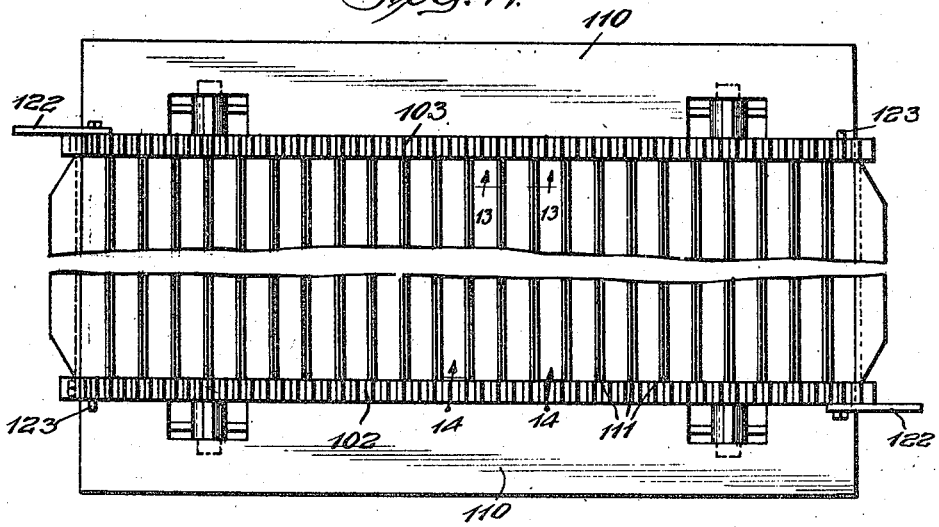
Fig. 11 is a plan view of the brick carrying cradle.
Figure 12:
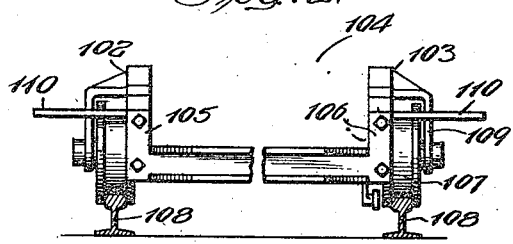
Fig. 12 is an end elevational view.

Wheel 10 which I refer to herein as the hacking reel, may be constructed on eight substantially 44" diameter pulleys 16 with faces 8" wide, and with pocket members bolted to the rims as shown in Fig. 4ᴬ or it may be constructed as shown in Fig. 3.

Referring particularly to Fig. 4ᵃ, it will be seen that one or more pulleys 16 may be mounted upon a common shaft, such as 17, shown in Fig. 3, which is mounted in suitable trunnions in the pedestals 18. To the rim of each pulley 16, I bolt a plurality of pocket forming members 19, which in this case, comprise each a radial flange 20 and a circumferential base 21. The base lies flat upon the cylindrical surface of the rim. These pocket forming members may be made up in individual L-shaped members or they may be made up in a series of such members joined together. Between the radial flange 20, pockets or grooves 22 for receiving the slugs 7 are formed.

The rims of the wheels 16 may be separated a short distance from each other in this form of construction, in order that cutting discs 23 which are suitably driven by a motor as will be explained later may pass down between the pulleys 16 in a radial direction in order to cut the bars or slugs of clay into proper brick lengths.

These rotary cutting discs 23 are preferably mounted as indicated in Figs. 9 and 10. A common driving shaft 25 lies parallel to the shaft 17 of the hacking reel 10. Upon this shaft 25 are mounted for pivotal movement a plurality of arms 26, these arms being forked at both their inner and at their outer ends. The inner forked end comprises two bearings 27—28 upon the shaft 25, between which is provided a pulley 29, which pulley is fastened to the shaft 25. At their outer ends, the arms 26 have a pair of bearings 30—31 for a short shaft 32, upon which short shaft is mounted a driven pulley 33. To this driven pulley 33, the cutting disc 23 is fastened. A belt 34 is trained over the pulleys 29 and 33 so that rotation of the shaft 25, as by means of the motor 35 will drive the cutting discs 23 for cutting the slugs or bars of clay as the hacking reel 10 rotates towards the cutting disc 23. The arms 26 are each provided with an adjustable stop member 36 mounted upon a suitable portion 37 of the frame of the machine, and these arms are pressed toward said stop by means of coil springs 38 which springs press at their outer ends against a common transverse bar 39, supported at its ends on the brackets 40 and 41.

In Fig. 7 I have shown a cross-sectional view of another form of hacking reel 10; this hacking reel comprises a cylindrical barrel member 42 suitably supported upon spiders 43 which are formed in the shape of pulleys with a cylindrical rim 44 and an inwardly extending flange 45 which forms guides for the tripping rod 46. The purpose of the tripping rod is to hold the guides 11 in register with succeeding empty pockets 22 until such pockets are filled by the entry of slugs or bars of clay. The supporting frame of the guides 11 has a stop plate 50 which is adapted to be engaged by the ends of the stop rods 46, these rods being guided in suitable holes in the rim 47 of the gear wheel 48. Springs 49 normally move the stop rods 46 in position to engage the stop 50 and are removed from engagement therewith by means of levers 51 at the rear end of the hacking reel 10, these levers 51 bearing plates 52 which are adapted to be engaged by the ends of the slugs of clay after they enter the groove or row of pockets and fill the same. That is to say, as soon as a slug of clay fills a groove or row of pockets and engages the plate 52 it moves the lever 51 so as to release the rod 46 from engagement with the catch 50 and this permits the guides 11 to be moved into register with the next set of empty pockets 22, by means of the pneumatic cylinder 90 or equivalent means.

The hacking reel rotates at a substantially constant speed under the control of a suitable governor 100 (Fig. 16), the governor being adjustable as to speed in order that the rotation of the hacking reel may be timed to correspond with the rate at which slugs of clay are projected from the brick machine 1 and fed into the pockets 22 on the reel.

The stop 50 which holds the guides 11 and the pockets on the hacking reel 10 in proper register is mounted upon a swinging support member 55 which is pivoted upon the shaft 17 at the forward end of the hacking reel. The guides 11 comprise two side strips or webs 56 and 57 and a central web or strip 58; these guiding strips being secured at their forward end to a frame member 59, which is connected to links 60, these links in turn being pivoted upon stationary pins. This linkage permits of a fairly free movement of the guides.

The forward end of the webs 56 and 57 are inclined inwardly so as to guide the bars or slugs of clay into a predetermined position so that they will be guided into the pockets 22 on the hacking reel. The rear parts of plates 56 and 57 converge less sharply and form substantially straight passageways for guiding the slugs 7 into the channels or pockets 22 from the belt 8. The rear ends of the plates 56, 57 and 58 are connected by a bottom plate member 63 which is in turn fastened to the swinging arm 55. Suitable bearing brackets 64 are secured to the ends of the plates 56, 57 and 58, these bearing brackets supporting the pulley 65 in proper relation to the channels formed between the plates or guides 56, 57 and 58. A kicker belt 66 having suitable lugs or brackets 67, 68 connected thereto is trained over the pulley 65 and at the forward end of the guide 11, this kicker belt is trained over a pulley 69, mounted on a suitable shaft 70, which shaft is supported in suitable bearings at 71 mounted upon the conveyor frame. The shaft 70 is adapted to be connected by means of a magnetic clutch 73 to a constantly rotating shaft 74 thru the operation of control means such as shown in Fig. 21. A light spring pressed detector finger 75 is mounted upon one side of the guide members, for instance the guide plate 56. This detector finger is connected as by means of the pawl 76 to a ratchet member 77. The ratchet member in turn controls a pair of switch arms 78 which are adapted to contact successively with the contacts 79 and 80, so that the entry of a bar of clay into the guide formed between plates 56 and 58 beyond finger 75 will energize the magnetic clutch 73 to start the kicker into operation. Instead of a magnetic clutch any other suitably controlled means may be employed to put the kicker into operation.

The magnetic clutch 73 is connected in series thru one of the switch arms 78, one of the contacts 79 or 80 and their corresponding lines 81 and 82 to the contacts 83 and 84 and there in turn thru one of the switch arms 85 back to the supply line 86. When a bar of clay has passed into the guide and permitted the detector finger 75 to drop back to the position shown in the drawings, one of the switch arms 78 will have been transferred from contact 79 to 80 or from 80 back to 79, as the case may be, thereby closing the circuit of the magnetic clutch and causing the kicker belt to advance the kicker brackets 67 or 68, as the case may be, back of the bar of clay to push the same into the pocket 22 on the hacking reel 10, at a speed considerably in excess of the speed of the belt 8. A similar detector finger 87 is arranged to be actuated when the bar of clay has passed the end of the guides 11 to shift the switch arms 85 so as to open the circuit which was previously closed by the detector finger 75. Thus, as will be apparent, from Fig. 21, so long as no bar of clay is either entering or departing from the guides 11, the circuit is open and the kicker is not in operation. As soon as a bar of clay has passed into the guide, past the detector finger 75, the detector finger drops into the position shown closing, we will say, switch arm 78, contact 79, whereupon the clutch 73 will be operated to force the bar of clay out of the guides and into the corresponding pocket 22. As soon as a bar of clay has been forced past the detector finger 87, this finger drops back and by means of the pawl 88 operates the ratchet 89 which in turn shifts the contact finger 85 from the contact 83, to the contact 84, whereupon the circuit will again be broken. However, the circuit is then prepared so that the next operation of the detector finger 75 will again energize the clutch to operate the kicker. Thus by alternate operation of the detector fingers, the bars of clay will be detected in the guides and will be assisted by the kicker into pockets 22 on hacking reel, by a quick movement so as to give the guide time to shift into registry with the next pair of pockets before the kicker is again operated. The guiding plates 56, 57 and 58 are flexible and are permitted to move with the hacking reel 10 so that the ends of the guides 11 will be in register with the corresponding empty pockets 22, the hacking reel 10 advancing during such operation. The forward movement of the hacking reel carries the guides with the reel thru the engagement of the corresponding rod 46 at the ends of which engages the engaging plate 50.

I provide a resilient member, in this case an air pressed piston member 92 to hold the guides firmly but yieldingly in engagement with the corresponding stop rod 46. A cylinder 90 is connected thru a pipe 91 to the local compressed air supply and the piston 92 opposes the motion of the hacking reel 10, which under the weight of the bricks deposited in the pockets on one side of the wheel tends to rotate toward the cylinder 90. Thus the guide 11 follows the reel until the discharge of the clay into the empty pockets trips the corresponding rod 46 from the catch or detent 50 and then the air pressure back of the piston 92 throws the guide 11 forward into engagement with the next stop rod 46 with the guide in register with the next pair of empty pockets on the hacking reel 10. The piston 92 is connected to a plate 93 secured to the bottom of the guiding plates 56, 57 and 58 thru a suitable plunger rod 94. A mechanical spring may be employed if desired instead of the air piston and cylinder above illustrated.

I have provided a motion limit switch 96 so that in case a bar of clay does not enter the empty pockets in time to trip out the detent rods 46 before the guide 11 will have moved more than the usual distance the closing of the switch will energize a solenoid 97 which applies a brake 98 to a suitable brake-wheel connected to the shaft 17 either mounted directly thereupon or connected thru suitable gearing as shown in Fig. 21. The brake-wheel 99 preferably is a part of the governor controlling the rate of forward motion of the hacking reel and energization of the solenoid 97 blocks forward motion of the hacking reel by stopping the governor. The hacking reel 10 will thus stand stationary until a bar of clay is shot into the corresponding empty pocket for tripping out the holding rod 46 whereupon the guide 11 will shift over to the next pair of empty pockets and the switch contact 96 will be opened, permitting the wheel to resume its advance.

After the slugs are discharged into the pockets 22, they are advanced laterally toward the cutting discs 23 where the slugs are severed into brick lengths, in this case, approximately $8\frac{8}{16}''$ in length. The adjacent side of the hacking reel is loaded with bars of clay, and with cut bricks and is therefore much heavier than the opposite side of the wheel, so that there is a constant tendency for the wheel to rotate as clay is fed into the pockets and discharged from the pockets below. The governor 100 indicated in Fig. 16 governs the rate of movement of the hacking reel 10. Power is taken from the hacking reel for advancing the cradles under the reel so that the cradles are automatically fed forward into position to be filled with bricks and are then discharged from the remote side of the hacking reel where they pass on to the setting elevator.

The shaft 17 of the hacking reel 10 has a pair of gear wheels 47 and 101, the teeth of which mesh with the racks 102 and 103 formed on the sides of the cradles 104. The cradles 104 are provided with suitable side plates 105 and 106 on which are mounted four wheels 107, these wheels running on tracks 108. Since the interior of the cradles must be left clear the wheels 107 are mounted on the side plates thru the medium of brackets 109. Friction flanges 110 are mounted at the sides of these cradles, these flanges being adapted to be engaged by friction wheels as will be explained later for driving the cradles off or on to the elevators. The cradles 104 preferably have a substantially square brick receiving surface as will be described more in detail later. The purpose of having this surface square is to permit successive tiers or layers to be turned thru 90° and yet match completely.

The cradles are provided with a plurality of partitions or guiding walls 111, which are adapted to receive the bricks as they are discharged from the hacking reel 10, these partitions being in some of the cradles of uniform thickness and evenly spaced, whereas in other cradles they are of unequal thickness and are adapted to space the bricks in pairs near to each other, for the purpose of setting the lower two layers of a stack so that the stack may be lifted by a suitable setting device or crane, as will be explained later. These partitions or guides 111—110 serve to hold between them in rows the individual bricks discharged from the hacking reel. The discharges from the hacking reel is prevented during the lower quarter of the movement of the bricks on the hacking reel by means of a belt 112 which forms a guide for retaining the bricks in the pockets 22. This belt 112 is trained over a driven pulley 113 where the bricks first come into contact with the belt, the belt being trained over a guiding roller or pulley 114 and then taken over a belt tightener pulley or roller 115 and then passing over a second guiding pulley 116 which is spaced a short distance away radially from the hacking reel than is the guiding pulley 114. The result is, that as the bricks pass over the pulley 114 they are permitted to drop out partially from the pocket 22, so that when they actually come into register with the pockets 117 as will be apparent later, they will more readily drop into the pockets 117 in the cradles 104.

The guiding belt 112 after passing over the lowermost roller or pulley 118, then passes back over the return pulley 119.

The belt 112 is preferably driven forward at a rate slightly greater than the rate of advance of the hacking reel 10 in order to hold the bricks definitely against one side of the pocket 22. This is to insure that the bricks will drop with uniform spacing out of the pocket 22 into the pockets 117.

The cradles 104 have at their ends cross frame members such as shown in section at 120 and 121 in Fig. 8. These cradles are adapted to be connected to each other by means of hooks 122 and pins 123. At their ends the cradles 104 have the cross bars 120 and 121 provided with webs as shown in Fig. 8 for spacing the cradles properly to secure continuity of receiving pockets 117 and continuity of the racks 102 and 103, so that the cradles may be driven forward and uniformly and properly filled with bricks.

The pockets 117 are closed by plates 125 which plates are connected by bracket arms 126 to a common operating arm 127. The common operating arm 127 may be fastened in any suitable way, as for instance, by means of a pin and registering holes to hold the bottom 125 in place.

Figure 13:
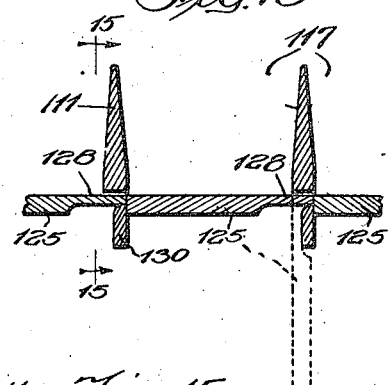
Fig. 13 is a fragmentary detail elevational view indicating the manner of mounting the supporting plates in the bottom of the pockets in the cradles, whereby the cradle full of bricks may be dumped in unison by gravity.
Figure 14:
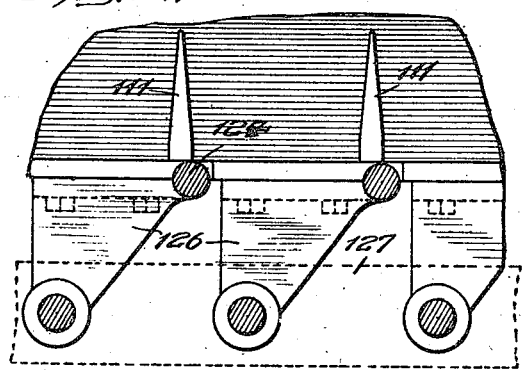
Fig. 14 is a fragmentary sectional view, illustrating the ends of the supporting plates and their common mounting on a cross bar to permit dumping of the pockets of the cradle all at the same time. This view is taken on the line 14—14 of Fig. 11.
Figure 15:
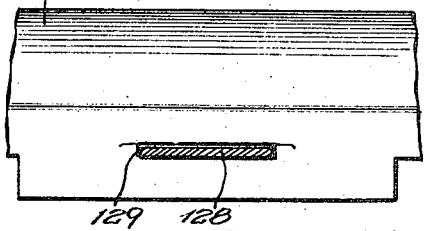
Fig. 15 is a side elevational view of the separating partitions between pockets on the cradle, this view being taken on the line 15—15 of Fig. 13.

The brackets 126 are provided at their ends with pivots 124 which are mounted in the side plates 105 and 106 of the cradles. In order to prevent sagging of these bottom plates 125, I have provided tongues 128 which are adapted to be moved into slots 129 in the lower portion of the separating partitions or guides 111. The lower portion of the guides 111 is reduced in thickness as will be seen at 130 in Fig. 13 and the tongues 128 are similarly reduced in thickness, so that as the bottom plate 125 folds down, the tongues 128 will lie along the side of the reduced portion 130 so that the bottom strips 125 form a continuation of the separating partitions or guiding walls 11, to permit the bricks to drop down vertically in forming the stack as will be explained later In one form of the apparatus to which I now refer, the hacking reel has 50 spaces comprising 2 sets of 24 active pockets and 2 dead pockets. The cradles have 24 rows of pockets $2\frac{1}{2}''$ wide separated by $\frac{3}{8}''$ plates 111. These rows receive 8 bricks which occupy together with the space between bricks $8\frac{9}{16}''$. The cradles are therefore about 69'' square.

It will be seen on Figs. 3 and 9 that the hacking reel 10 has two vacant pockets namely, 132 and 133 at opposite points on the hacking reel; these pockets or dead spaces are adapted to coincide with the dead spaces occupied by the end walls 120 and 121 of adjacent cradles 104. The guide 11 merely shifts on by the dead spaces 132 and 133 into register with the next pair of pockets beyond said dead spaces when these dead spaces come into register with said guide 11.

Figure 2:
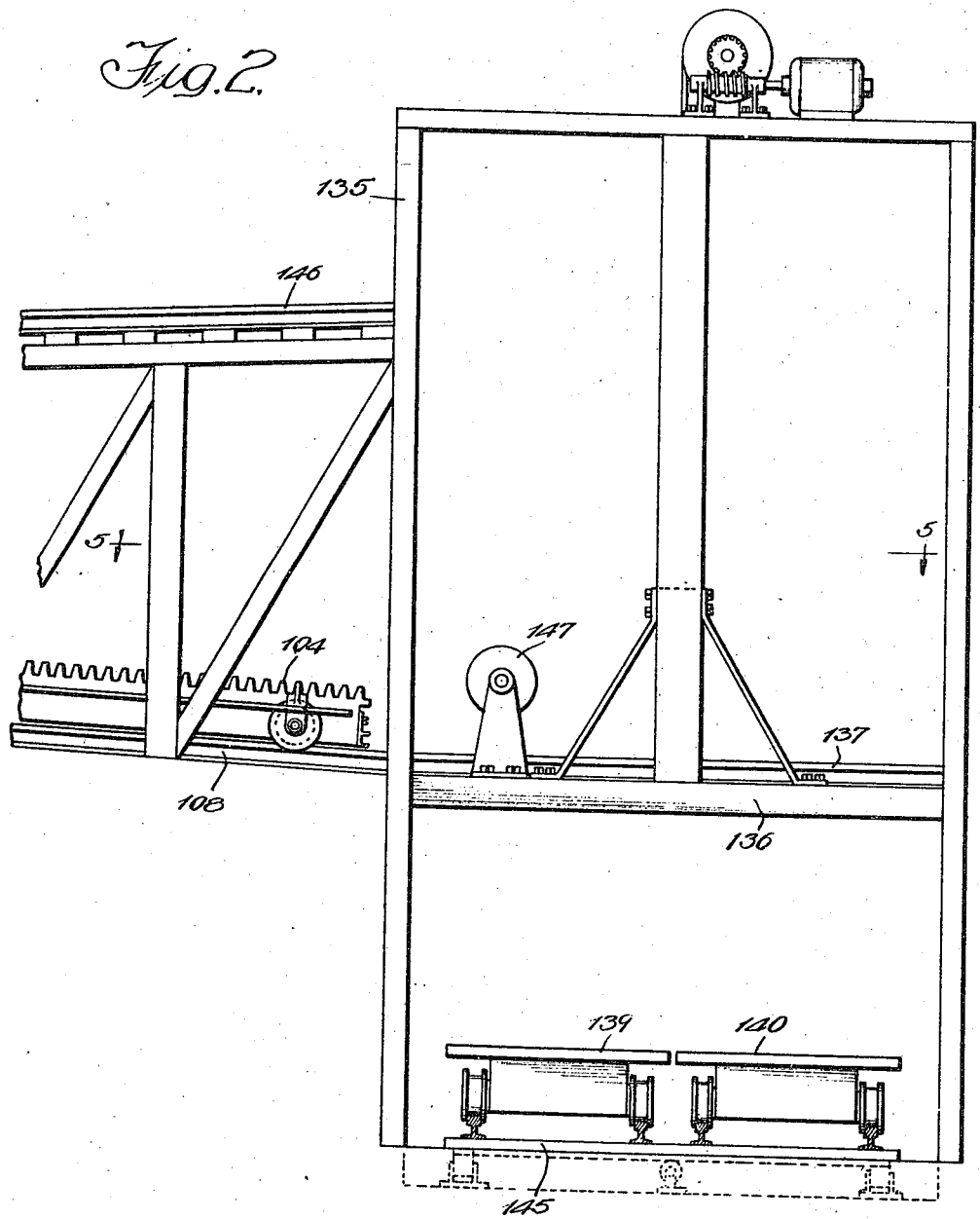
Fig. 2 is a side elevational view of the setting elevator taken on the line 2—2 of Fig. 1. This view shows a part of the receiving and discharge tracks for receiving the loaded cradles and for discharging them when they are empty.

The rails 108 form an incline track below the hacking reel 10 as will be apparent from Fig. 3, these rails leading to a setting elevator 135 shown in Fig. 2, which takes the loaded cradles 104 upon its platform 136, this platform consisting merely of a rectangular frame work for supporting the rails 137 leaving a large rectangular opening 138 therethrough, through which the bricks may be dropped from the pockets 117 in the cradles 104 upon the platforms of the dryer cars 139 and 140. The cars 139 and 140 are run in pairs on tracks 141, 142 which converge as indicated in Fig. 1 to bring the cars in parallel relation upon the turntable 145, which turntable is capable of rotation for setting the bricks in alternately cross layers. The cars 139 and 140 may be advanced by the pusher mechanism 144 as will be understood by those skilled in the art. The function of the elevator 135 is to take the cradles 104 individually, lower them to the proper position where the bricks are discharged upon the platforms of the cars or upon the stack which is formed thereon, then the empty cradle is raised by the elevator to an upper level where the empty cradles are discharged upon the return tracks 146. The platform of the elevator 135 is provided with means for feeding the cradles onto and off of the tracks 137. This means preferably comprises a pair of friction wheels 147 driven by a motor 148; these friction wheels being adapted to bear against the flanges 110 of the cradles 104. Thus, by proper rotation of the friction wheel 147 the loaded cradles may be moved upon the platform 136 and after the bricks are discharged therefrom, the cradles may, by reverse rotation of the wheel 147, be driven off of the elevator platform 136 upon the return track 146, which lies above the rails 108.

The return tracks 146 lead back to a lowering elevator 150, having a suitable platform 149 carrying the rails 148 to receive the cradles 104. This elevator is provided with friction wheels 151 for moving the cradles 104 onto and off of the elevator platform 149.

The piling of the bricks upon the dryer cars 139 and 140 is, in accordance with the well known requirement for the setting crane—namely, that the two lowermost courses or layers be laid in the same direction with suitable spaces between the pairs of bricks for the insertion of the fingers of the setting crane. I have illustrated this more or less diagrammatically in Fig. 22, in which the lowermost course 152 is laid with the bricks set edgewise in pairs, so that spaces 153 are wide enough to permit insertion of the fingers of the setting crane; this space being on the order of $\frac{1}{4}$ of an inch. The pairs of bricks are substantially in contact, being separated by only $\frac{1}{4}$ of an inch, as will be apparent by reference to Fig. 8 which shows one of the returning cars at the top of the figure, provided with separators alternately thick and thin, in order to provide the corresponding spaces of the bricks for the two lowermost courses. A second course of bricks is laid directly over and in register with the lowermost course 152. This means that the spaces between pairs of bricks is substantially $\frac{1}{4}$ of an inch wide and substantially 8'' high, permitting sufficient room for the fingers of the crane to lift the stacks and grip between them the pairs of bricks in the two lower courses 152 and 154. The next higher course 155 is then laid cross-wise with respect to the two lower courses and the succeeding courses above that cross each other. While this is the preferred manner of setting the bricks, it will be understood that the invention is not limited to such manner of putting the bricks in a stack.

The stack is preferably made 8 courses high of which the lower two, as above explained, are parallel, that is, lie the same way and the succeeding courses are crossed. Hence, in order to arrange for proper setting of the bricks two special cradles 104 of the character shown at the top of Fig. 8 are provided, these being designed to lay the lower courses 152 and 154. The other six cradles of the set hold the bricks in uniformly spaced position, as is obvious from the cradle shown beneath the hacking reel 10 in Fig. 8. Obviously, different arrangements may be made from what I have indicated and more than eight cars may be employed, or less than eight cars may be employed as desired.

The turntable 145 is first moved so that the cars 139 and 140 are arranged crosswise with respect to the tracks 141 and 142, so that the first two layers may be placed upon the cars 139 and 140 in such a manner that the stack of bricks when separated, as will be explained later, will leave two stacks which may be picked up by the crane by inserting the fingers of the crane into the stacks from the side of the car. Thereafter the turntable 145 is turned so that the layer 155 of bricks may be placed crosswise with respect to the two lower layers 152 and 154. After the eight courses are laid, that is, after the stack is completed, the two cars 139 and 140 constituting the pairs are then run forward on the tracks 141 and 142 until they come forward to the diverging portion 157 where the cars are separated and the stack is pulled apart; that is to say, by leading the cars off laterally with respect to each other, and at the same time, advancing them at the same rate, the stack is pulled apart in the middle, leaving two cars, each with half a stack, which half stack is a full load for the setting crane. The cars are then run into the dryer, after which the stacks of brick are taken from the cars by the setting crane and set in the kiln for burning.

The control of tripping of the guides 11 may be performed by the completion of the operation of the kicker 12, as will be apparent from Figs. 20 and 20ᴬ. In this case the swinging arm 55 which holds the guides 11 in register with the proper pocket 22, is provided with a small swinging latch 160, held in place by a spring 161 so that the latch drops into place to engage projections or bosses 162 fastened to a moving part of the hacking reel 10, in this case the gear wheel 162 which is connected to the shaft 17 of the hacking reel 10 and which engages the rack on the cradles 104. The latch 160 is connected by a link 164 to a rocking arm 165 which is fastened on the rocker shaft 166; this rocker shaft having a finger 167 for engaging with the kicker brackets 67 or 68 as the case may be of the kicker 12. Thus, each time the kicker has completed a stroke of shooting a bar of clay into the proper pocket 22, the kicker brackets or vanes 67 and 68 will engage the detecting finger 167 and trip the latch 160, permitting the pneumatic cylinder 90 to throw the guides 11 forward to engage the next projection 162 for registering the guides 11 with the next pair of empty pockets. Thus the advance of the guides with respect to the hacking reel 10 is controlled by the operation of the kicker in discharging slugs of clay into the pocket of the hacking reel 10.

The operation of the system as a whole is as follows:

The brick machine 1 is fed with clay and is put into operation so that two streams of clay 2—2 are projected out of the die of the machine, these streams of clay being spread by means of the spreader 5 and lying upon the measuring belt 3. The streams of clay are cut into bars of a proper length as indicated at 7 by the cutter 6 and as the bars are cut off they are passed upon the forwarding belt and table 8. The bars of clay 7 are then passed into the guides 11 where they operate the trigger or detector mechanism for throwing the kicker belt 12 into operation; this kicker belt then projecting the bars of clay onto the hacking reel 10 in suitable empty pockets 22, which are held in register with the outer end of the guides 11. As soon as the clay is discharged into the proper pockets 22, the connection between the guides 11 and the hacking reel 10 is tripped to permit the guides to be advanced to the next pair of empty pockets. The hacking reel 10 is permitted to rotate continuously under the weight of the bars of clay which lie at one side of the axis of the wheel. The bars of clay then pass downwardly, passing by and in contact with the cutting discs 23, which may be rapidly rotated to assist in the cutting operation, or which may merely be rolled in contact with the bars of clay as desired. Suitable cradles 104 provided with partitions or guides 111 defining pockets 117 these pockets extending transversely of the cradles are then fed under the hacking reel 10 by means of the gear wheels 47 and 101, the cradles being suitably connected together by hooks so that they form a continuous operating track, being unhooked at the opposite side of the hacking reel after they are loaded with bricks. In the regular order of procedure, the two special cradles are first filled and advanced to the setting elevator 135 where the cradles are received and lowered to the proper distance above the cars 139 and 140 on the turntable 145, these cars being connected together at that time to form a single platform. The lowermost table is laid so that the endwise rows of bricks lie crosswise of the cars 139—140. The next cradle deposits its layer in register with the first layer. The two lower layers are laid by specially constructed cradles, the bricks are deposited in pairs of rows, and so spaced as to permit entry of the crane fingers between pairs of rows. The turntable 145 is then turned until the cars are at 90° to their former position, whereupon the other six cradles 104 deposits their layers of bricks crosswise with respect to each other in the well known manner. The operation of controlling the position of the elevator platform for successive dumping operations may be automatically controlled so that all the operator does is press button 1, 2, 3, 4, 5, 6, 7, or 8 for the successive layers. Each cradle, after it is lowered to the proper position is dumped by releasing the bar 127 and permitting the bottom plates 125 to rotate out of the way to permit the bricks to drop thru the pockets 117 upon the cars 139—140. Thereafter, the bar 127 is swung to close the pockets 117, the elevator platform is raised to bring the car into register with the return track 146 and the cradle is shot off by reverse motion of friction discs on to the return track and by gravity returns to the lowering elevator 150, where the cradle is lowered to the lowermost track and again passes under the hacking reel 10 in regular order. After the proper number of bricks have been piled upon the cars 139—140 these cars are pushed along the tracks 141 and 142 to the divergent portion 157 where the stack is pulled apart into two halves. Thereupon suitable wire screen hoods are dropped over the tops of the stacks on each car to keep the top layer of bricks from being displaced, and the cars are then shoved thru the dryer and after passing thru the dryer the stacks are picked up and put into the kiln where the bricks are burned.

I do not intend to be limited to the details shown and described, as the same is merely illustrative of one manner of carrying out the invention. According to my view of the invention, the feature of cutting the clay streams into bars and shooting these bars into suitable receiving pockets, before they are cut into brick lengths is of great importance. By this procedure I never need to handle a single brick, but always am able to handle the bricks in quantities. For instance, in the system shown and described, I deal with a minimum of 16 bricks in any operation.

The use of a hacking reel is highly desirable, but it is not essential since it is possible to re-organize the system so that the bars of clay 7 are shot directly into pockets in the cradles and the bars or slugs may be cut into brick lengths in the cradles instead of on the hacking reel. However, I prefer to employ the hacking reel, since it simplifies the construction of the cradles and it also permits of an easier manner of getting rid of the clay which is trimmed off the ends of the bars and at the cuts.

It will also be apparent that instead of being compelled to turn the cars 139—140 on the turntable 145, I may provide an additional track coming in at 90° to the tracks 108 where they enter the elevator 135, so that the special cradles 104 for the first two layers may be run around at right angles, and the elevator platform 136 may be provided with two sets of tracks at right angles to each other to permit of this operation.

Suitable automatic or semi-automatic controls may be provided at each point, such for instance, as the various operations of the elevators 135 and 150, for the feeding of the cars 139 and 140, for the rotation of the turntable 145, and for such other operations as have been referred to.

I claim:

1. The method of making and assembling bricks which comprises, extruding clay thru a die in a parallel-sided stream, assembling slugs of a plurality of brick lengths in parallel relation to each other, and cutting the assembled parallel slugs at right angles into brick lengths.

2. The method of making, assembling and stacking bricks which comprises, extruding clay thru a die in a parallel sided stream, assembling slugs of a plurality of brick lengths in parallel relation to each other, cutting the assembled parallel slugs at right angles into brick lengths, separating groups of said bricks into layers and assembling said layers vertically into a stack.

3. The method of making and assembling bricks which comprises, projecting a continuous stream of clay of cross-section corresponding to the cross-section of a brick, cutting said stream into sections or slugs of a plurality of brick lengths in length, assembling the slugs in parallel relation to each other and cutting the slugs at right angles to their lengths into bricks.

4. The method of making and assembling bricks which comprises, extruding a parallel sided stream of clay, severing said stream into slugs of a length in excess of the length of a single brick, assembling the slugs in parallel relation to each other, and moving the slugs at right angles to their parallel sides and cutting them into bricks.

5. The method of making and assembling bricks which comprises, extruding a parallel sided stream of clay, severing said stream into slugs of a length in excess of the length of a single brick, cutting the assembled parallel slugs at right angles into brick lengths, separating groups of said bricks into layers and assembling said layers vertically into a stack.

6. The method of making and assembling bricks which comprises, extruding a parallel sided stream of clay which is oblong in cross section, cutting the stream into slugs, grouping the slugs into parallel relation to each other upon a surface traveling at right angles to the length of the slugs, cutting the slugs into brick lengths along lines at right angles to the sides of the bricks, dividing said bricks into groups of a width substantially equal to the length of a row of bricks, and superposing the groups in cross relation to each other.

7. The method of making and assembling bricks which comprises extruding a parallel sided stream of clay which is oblong in cross section, cutting the stream into slugs, grouping the slugs, into parallel relation to each other upon a surface traveling at right angles to the length of the slugs, cutting the slugs into brick lengths along lines at right angles to the sides of the brick, dividing said bricks into groups of a width substantially equal to the length of a row of bricks, and superposing the groups in crossed relation to each other, and dividing the superposed groups into two stacks, by pulling the groups apart along a vertical plane.

8. The method of making and stacking bricks which comprises forming the bricks, assembling the bricks in layers, piling successive layers upon two adjacent supporting surfaces, and then pulling the supporting surfaces apart horizontally to divide the layers into two stacks.

9. The method of making and stacking bricks which comprises forming the bricks, assembling them all in parallel relation into layers, piling successively crossed layers upon two adjacent supporting surfaces, said two adjacent supporting surfaces being halves of a square and then pulling the supporting surfaces apart horizontally to divide the stack so formed into two oblong stacks.

10. The method of making and stacking bricks, which comprises, forming the bricks, assembling a plurality of the bricks into a substantially square layer, the bricks all lying parallel to each other, depositing said layers in cross relation in register with each other upon two adjacent supporting surfaces which, together, form a substantially square support, then drawing the supporting surfaces apart horizontally to divide the layers into two oblong stacks.

11. The method of making and stacking bricks which comprises, forming the bricks collecting a plurality of the bricks in parallel rows into a horizontal square layer, piling layer upon layer in crossed superposed relation upon a supporting surface, separating said supporting surface and moving the parts laterally away from each other to separate the bricks into two stacks.

12. The method of making and forming stacks of bricks upon oblong cars which comprises, juxtaposing said oblong cars side by side to form a common supporting surface, forming the bricks, collecting a plurality of the bricks in parallel rows into horizontal square layers, superposing said layers upon each other in crossed relation upon said common supporting surface, to form a square stack, then moving the cars together forwardly along divergent tracks to pull the square stacks into two parts.

13. The method of making and assembling bricks which comprises, projecting a parallel sided stream of clay of a cross section substantially that of a brick in slugs or sections endwise upon a surface which travels at right angles to the sides of the clay, to deposit a plurality of slugs or sections all in parallel relation to each other on said traveling surface, and severing said slugs at right angles to their lengths to form bricks lying in transverse rows.

14. The method of making and assembling bricks, which comprises, projecting a parallel-sided stream of clay of a cross section substantially that of a brick in slugs or sections endwise upon a surface which travels at right angles to the sides of the clay, to deposit a plurality of slugs or sections all in parallel relation to each other on said traveling surface, and severing said slugs at right angles to their lengths to form bricks lying in transverse rows, separating said traveling surface into substantially square portions and superposing the bricks supported upon each square portion to form a series of square layers constituting a stack.

15. The method of making and assembling bricks, which comprises, projecting a parallel sided stream of clay of a cross section substantially that of a brick in slugs or sections endwise upon a surface which travels at right angles to the sides of the clay, to deposit a plurality of slugs or sections all in parallel relation to each other on said traveling surface, and severing said slugs at right angles to their lengths to form bricks lying in transverse rows, dividing the bricks upon said traveling surface into substantially square groups and superposing the groups of bricks to form a series of square layers constituting a stack, and pulling the stack laterally into halves.

16. In combination, a brick machine having a die for projecting a rectangular bar of clay, a measuring belt for receiving said bar of clay, a cutting device for cutting said bar into slugs of a plurality of brick lengths in length, and an offbearing belt traveling at a greater surface speed than the measuring belt for separating said slugs longitudinally, and a projecting device for taking off the slugs from the off bearing belt at an increased speed.

17. In combination, means for projecting a rectangular parallel-sided bar of clay of a transverse cross section the same as a transverse cross section of a brick and means for cutting said bar of clay into slugs of a length substantially equal to a plurality of brick lengths.

18. In combination, a brick machine having a rectangular die for projecting a bar of clay of a transverse cross section substantially the same as the transverse cross section of a brick, means for receiving said bar of clay, and means for cutting said bar of clay into slugs of approximately eight brick lengths.

19. In combination, means for projecting a rectangular stream of clay, means for cutting said stream of clay into slugs of a length equal to a plurality of brick lengths, means for assembling said slugs in parallel relation and means for cutting said slugs into bricks lying in straight rows in two directions.

20. In combination, means for projecting a rectangular stream of clay of a cross section substantially equal to the cross section of a brick, means for cutting said stream of clay into slugs of a length substantially equal to a plurality of brick lengths, means for assembling said slugs in parallel spaced relationship, means for cutting said slugs transversely into bricks, which bricks are in spaced alignment in both dimensions.

21. In combination, means for projecting a rectangular stream of clay of a cross section substantially equal to the cross section of a brick, means for cutting said stream into slugs, means for separating the slugs endwise from each other and for advancing the slugs in the direction of their length, a traveling surface traveling at right angles to the direction of motion of said slugs, means for depositing said slugs upon said traveling surface, all in parallel spaced relationship and cutting means for cutting each bar of clay into a plurality of bricks upon said traveling surface.

22. In combination, a hacking reel, having a plurality of peripheral pockets adapted to receive slugs of clay of a plurality of brick lengths in length and cutting means cooperating with said hacking reel, adapted to cut the slugs of clay in said peripheral pockets into brick lengths.

23. In combination, a traveling surface having a plurality of pockets adapted to receive slugs of clay of a plurality of brick lengths in length, and a relatively stationary cutting device for cutting each bar of clay into a plurality of bricks on said traveling surface.

24. In combination, means for forming a plurality of slugs of clay of a plurality of brick lengths in length and of a cross section substantially equal to the cross section of a brick, a traveling surface having pockets adapted to receive said slugs of clay, a traveling surface arranged at right angles to said first traveling surface, said latter traveling surface being adapted to convey slugs of clay to the second traveling surface, and means for transferring the slugs of clay endwise from the second traveling surface into the pockets on the first traveling surface.

25. In combination, a traveling surface having a plurality of pockets adapted to receive slugs of clay of a length substantially equal to a plurality of brick lengths, means for projecting a stream of clay for forming said slugs, means for cutting the stream into slugs, and means for projecting the slugs into the pockets at a greater surface speed than the speed of projection of the stream of clay.

26. In combination, a traveling surface having a plurality of pockets for receiving slugs of clay, means for projecting a stream of clay of the desired cross section adapted to fit said pockets, means for cutting said stream of clay into slugs and means for projecting the slugs of clay into said peripheral pockets at a rate of movement not less than the rate of movement of the stream of clay.

27. In combination, a traveling surface having pockets of a length substantially equal to a plurality of brick lengths, relatively stationary cutting means for cutting the slugs of clay into brick lengths in said pockets, and means for projecting slugs of clay of a cross section, substantially equal to the cross section of a brick into said pockets.

28. In combination, means for extruding and cutting bar of clay of a cross section substantially equal to the cross section of a brick, and of a length substantially equal to a plurality of brick lengths, a traveling surface having a plurality of pockets adapted to receive said slugs, a traveling conveyor for conveying slugs of clay to said traveling surface, flexible guiding means adapted to register with successive pockets of the traveling surface, and means for projecting slugs of clay through said flexible guide into said pockets.

29. In combination, means for extruding and cutting bars of clay of a cross section substantially equal to the cross section of a brick, and of a length substantially equal to a plurality of brick lengths, a traveling surface having pockets adapted to receive said slugs of clay, a traveling conveyor for conveying slugs of clay endwise towards said traveling surface, flexible guides, means for holding the guides in register with succeeding empty pockets on the traveling surface, means for projecting slugs of clay from said conveyor into the pockets on said traveling surface, and means for releasing the connection between the flexible guides and the traveling surface after the discharge of a slug of clay thru the guides into the registering pockets.

30. In combination, means for extruding a stream of clay and cutting it into slugs of a cross section substantially equal to the cross section of a brick, and of a length substantially equal to a plurality of brick lengths, a hacking reel having a plurality of peripheral pockets for receiving said slugs of clay, a conveyor for conveying slugs of clay endwise towards the ends of said pockets, guiding means adapted to be temporarily aligned with the pockets on the hacking reel, and means for projecting slugs of clay thru said guides into said peripheral pockets.

31. In combination, means for extruding a stream of clay and cutting it into slugs of a cross section equal to the cross section of a brick and of a length substantially equal to a plurality of brick lengths, a hacking device having a plurality of parallel pockets, said device having means for moving said pockets at right angles to their length, a traveling conveyor for conveying said slugs of clay in a direction lengthwise of said pockets, guides adapted to be temporarily aligned with pockets on the hacking device, and means for projecting slugs of clay thru said guides into the pockets on the hacking device.

32. In combination, means for extruding a stream of clay and cutting it into slugs of a cross section equal to the cross section of a brick and of a length substantially equal to a plurality of brick lengths, a hacking device having a plurality of parallel pockets, said device having means for moving said pockets at right angles to their length, a traveling conveyor for conveying said slugs of clay in a direction lengthwise of said pockets, guides adapted to be temporarily aligned with pockets on the hacking device, and means for projecting slugs of clay thru said guides into the pockets on the hacking device, means for holding the guides and pockets in alignment, and means controlled by the discharge of a slug of clay into the corresponding pockets for releasing said connection.

33. In combination, means for extruding a stream of clay and cutting it into slugs of a cross section substantially equal to the cross section of a brick and of a length substantially equal to a plurality of brick lengths a hacking device having pockets lying transversely thereof, a conveyor adapted to convey said slugs of clay in a direction longitudinally with respect to said pockets, a guide adapted to be aligned with the pockets on the hacking device, detent means for holding the guides successively in register with the pockets, means for releasing said detent means when a slug of clay is discharged thru the guide into the registering pocket, and means for moving the guides in register with the next empty pocket.

34. In combination, means for extruding a stream of clay and cutting it into slugs of a cross section substantially equal to the cross section of a brick, and of a length substantially equal to a plurality of brick lengths, a hacking device having a surface adapted to be moved forward, said surface having transverse slug receiving pockets, a conveyor belt for moving said slugs longitudinally towards said pockets, guiding means adapted to be held in register with the succeeding pocket until a slug of clay is discharged into the corresponding pocket, and means for stopping the advance of the hacking device upon failure of a slug of clay to fill the pocket.

35. In combination, a hacking reel having peripheral pockets adapted to receive slugs of clay, and a plurality of cutting discs operated in unison to cut a slug of clay in brick lengths.

36. In combination, a hacking reel comprising a cylindrical body having peripheral pockets lying parallel to the axis of the cylindrical body and adapted to receive slugs of clay therein, and a cutting device comprising a plurality of cutting discs adapted to cut the slugs successively into brick lengths, each slug being cut substantially simultaneously into a plurality of bricks.

37. In combination, a hacking reel comprising a plurality of pockets arranged about the surface of a cylinder, means for discharging slugs of clay endwise into said pockets, a plurality of cutting discs individually mounted but operating to cut a bar into bricks in unison, and means for discharging the bricks radially in unison from each pocket.

38. In combination, a hacking reel comprising a plurality of pockets arranged about the periphery of a cylinder, said pockets being parallel to the axis of the cylinder, means for projecting slugs of clay into the pockets by movement endwise of the pockets, means for cutting each slug into brick lengths, means for holding the bricks in the pockets until they reach a predetermined point on the lower side of the hacking reel, and means for receiving the bricks from each pocket.

39. In combination, a rotating hacking reel having peripheral pockets for receiving slugs of clay parallel to the axis of the reel, cutting means for cutting the slugs into brick lengths, and cradles having pockets parallel to the pockets on the hacking reel and moved in unison with the movement of the hacking reel to receive an axial row of bricks from the pocket on the reel.

40. In a brick hacking device, a hacking reel having a plurality of parallel grooves, holding rows of bricks lying lengthwise, means for depositing bars of clay in said grooves and cutting them in bricks, and aligned in transverse rows, a track under said reel, a series of brick supporting cradles supported on said track, said cradles being joined together to form a substantially continuous brick receiving surface, and means for depositing the bricks from each cradle to form a layer.

41. In a brick hacking device, a hacking reel having a plurality of parallel grooves, holding rows of bricks aligned lengthwise and aligned in transverse rows, means for depositing bars of clay in said grooves and cutting them into bricks, a track under said reel, a series of square cradles joined together to form a substantially continuous brick receiving surface, means for depositing the bricks from each cradle to form a layer, and means to cause deposition of successive layers in crossed relation.

42. In combination, a plurality of cradles, having partitions for holding rows of bricks, means for forming and depositing bricks in said cradles, movable supporting plates for said rows to permit dumping of the bricks in said rows simultaneously, a receiving surface for receiving the bricks dumped from said cradles, and means to cause successive layers of bricks to be placed in crossed relation.

43. In combination, a track, a plurality of substantially square cradles having partitions for holding rows of bricks in a common plane to form a layer, means for forming and depositing bricks in said cradles, said cradles having means for simultaneously dumping said layer of bricks, an elevator having a movable platform for receiving successive cradles, supporting means for receiving successive layers of bricks from said cradles, and means for causing successive layers to be crossed with respect to each other.

44. In combination, a series of cradles having means for holding a layer of bricks in spaced relation, means for forming and depositing bricks in said cradles, and having means for simultaneously dumping said layer of bricks therefrom, elevator mechanism for bringing the cradles into vertical alignment successively with a receiving platform, said elevator being adapted to lay successive layers in crossed relation upon said platform.

45. In combination, a series of brick holding cradles for holding a substantially square layer of bricks in a common plane, means for forming and depositing bricks in said cradles, a pair of receiving cars forming a substantially square platform, and means for depositing layers of bricks upon said cars in superposed relation.

46. In combination, a cradle having a frame and supporting wheels adapted to cooperate with a track, partitions for holding rows of bricks between them, movable bottoms for said rows of brick, means for forming and depositing bricks upon said movable bottoms, a track for supporting said cradle, an elevator having a platform provided with a track, and means to permit the dumping of a cradle full of bricks thru said platform.

47. In combination, a track, an elevator adjacent said track, said elevator having a platform adapted to register with the track, a cradle adapted to run on said track and onto said elevator, means for forming and depositing a layer of bricks in said cradle, a dryer car adapted to be loaded with a stack of bricks deposited from successive cradles by said elevator, said elevator having means for supporting a layer of brick and means for dumping said layer upon said car.

48. In combination, a track, a cradle on said track, said cradle having means for supporting a layer of bricks thereupon, said means being adapted to dump a layer of bricks from the cradle, means for forming and depositing a layer of bricks on said cradle, an elevator having a vertically movable platform for receiving the cradle, a car having a receiving platform for receiving bricks from the cradle, said elevator being adapted to position the cradle vertically over the car at a proper distance to dump a layer of bricks upon the car.

49. In combination, a track, a plurality of square cradles mounted on said track, means for forming and depositing a layer of bricks on each of said cradles, a dryer car having a platform, an elevator adapted to receive the cradles, one at a time, and move them vertically into alignment with the platform of the dryer car, and means for securing relative rotation with respect to each other of successive layers of bricks deposited by successive cradles.

50. In combination, a hacking reel, means for depositing bars of clay on said hacking reel and cutting them into bricks, a track under said hacking reel for supporting cradles thereupon, a plurality of cradles for receiving substantially square layers of brick from the hacking reel, an elevator for receiving the cradles, said cradles having means for dumping said layer in a common plane, an elevator for vertically adjusting the position of dumping of the cradles, a return track for receiving the empty cradles from said elevator, and means for returning the cradles from the return track to the loading track under the hacking reel.

51. In combination, a hacking reel having longitudinal grooves thereupon adapted to receive slugs of clay of substantially 8 brick lengths in length, said reel having 48 active pockets and two inactive pockets around its periphery, means for forming and depositing slugs of clay in said grooves, means for cutting the bars of clay into bricks, cradles moved in unison with the hacking reel, said cradles each having 24 rows of receiving pockets of substantially 8 brick lengths in length and having means at their ends for connecting the cradles, the end walls of the adjacent cradles occupying substantially one brick width in width and means for registering the pockets of the cradles with the pockets on the hacking reel.

52. In combination, a hacking reel having longitudinal pockets for receiving slugs of clay, means for cutting said slugs of clay into a row of bricks, a receiving cradle, co-operating gear teeth on the cradle and on the hacking reel, for holding the reel and cradle in predetermined relation, and rows of pockets on the receiving cradle for receiving rows of bricks from the hacking reel.

53. In combination, a pair of dryer cars, means for forming and placing horizontal tiers of bricks upon said dryer cars, a pair of tracks for receiving said dryer cars, and for holding the cars close together while they are being loaded, said tracks continuing into a divergent portion for separating the cars laterally while they are moved forward to divide the common pile of bricks upon said cars.

54. In combination, a pair of substantially parallel tracks, having a convergent portion and a divergent portion, a pair of dryer cars adapted to be positioned side by side for receiving a stack of brick, while said cars are positioned on the parallel portion of said track and means for forming and depositing a stack of bricks upon said dryer cars.

55. In combination, a pair of cars having oblong platforms, tracks for bringing said platforms side by side to form a substantially square receiving platform, means for forming and depositing square layers of brick in crossed relation upon said platform, said tracks having a divergent portion for separating the cars laterally to permit the separation of the square stack of bricks.

56. In combination a hacking reel, a track under the hacking reel, a series of cradles adapted to be connected together and pass under the hacking reel, means for forming and depositing bricks in said cradles, a pair of elevators at opposite sides of the hacking reel, and a return track connecting the tops of the elevators for returning the cradles.

57. In combination, a hacking reel for receiving slugs of clay and means for cutting them into bricks, a track under the hacking reel, cradles connected together and running on said tracks under the hacking reel for receiving the bricks in rows in said cradles, said track being downwardly inclined, an elevator at the lower end of the track, a return elevator at the opposte end of said track, and a return track inclined from the top of the first elevator to the top of said return elevator.

58. The method of making bricks which comprises, forming clay into parallel sided bars, each of a cross section the same as that of a brick, cutting said bars into slugs assembling the slugs laterally in parallel relation to each other, and cutting the slugs when so assembled into brick lengths in transverse rows.

59. The method of making bricks which comprises, forming clay into parallel sided bars, each of a transverse cross section the same as that of a brick, cutting said bars into slugs assembling the slugs in parallel relation to each other, and cutting the slugs when so assembled into brick lengths in transverse rows, then separating substantially square groups of said bricks into layers and superposing the layers bodily upon each other in crossed relation.

60. In combination, a group of cradles for receiving and supporting a layer of brick, means for forming and depositing bricks in said cradles, one of said cradles having means for spacing the bricks of each layer into pairs of rows which are separated a distance great enough to permit the entry of fingers of a setting device.

61. In combination, a group of cradles, each adapted to support a layer of bricks all lying in parallel spaced relationship, means for forming and depositing bricks in said cradles, two of said cradles having means for spacing the bricks of the corresponding layers in double rows, which double rows are spaced apart for the reception of the fingers of a setting device, and the other cradles of the set being provided with means for spacing the bricks apart uniformly.

62. In combination, a group of cradles, each adapted to contain a layer of bricks, means for forming and depositing a layer of bricks in each of said cradles, the first two cradles of the set being adapted to space the bricks of the corresponding layers in double rows to receive the fingers of a setting device, the other cradles supporting the corresponding layers in uniformly spaced relation, and a setting elevator for setting successive layers by means of successive cradles.

63. In combination, means for extruding two finished streams of clay each of a transverse cross section the same as the transverse cross section of a brick, and means for cutting said bars simultaneously into pairs of slugs of a length substantially a multiple of one brick length.

64. In combination, means for extruding two finished streams of clay each of a transverse cross section the same as the transverse cross section of a brick, and means for cutting said bars simultaneously into pairs of slugs of a length substantially a multiple of one brick length, means for assembling successive pairs of slugs in line laterally, and then cutting across the assembled slugs laterally to divide them into bricks, said bricks being aligned in two directions.

65. The method of making bricks which comprises extruding longitudinally a stream of clay of a transverse cross section the same as the transverse cross section of a brick, cutting said stream into slugs of a predetermined length, moving the slugs longitudinally upon a transversely moving carrier, and assembling said slugs successively side by side upon said carrier.

In witness whereof, I hereunto subscribe my name this 13th day of June, 1922.

BERNARD F. WEBER.